(12) United States Patent
Guerry et al.

(10) Patent No.: US 11,254,035 B2
(45) Date of Patent: Feb. 22, 2022

(54) INJECTION MOLDED COMPONENT AND METHOD OF INJECTION MOLDING

(71) Applicant: Rehrig Pacific Company, Los Angeles, CA (US)

(72) Inventors: Brian Robert Guerry, Costa Mesa, CA (US); Matthew Richard Rutigliano, Waterford, PA (US); Sydney Marie Ogawa-Garcia, Riverside, CA (US)

(73) Assignee: REHRIG PACIFIC COMPANY, Los Angeles, CA (US)

( * ) Notice: Subject to any disclaimer, the term of this patent is extended or adjusted under 35 U.S.C. 154(b) by 93 days.

(21) Appl. No.: 16/675,542

(22) Filed: Nov. 6, 2019

(65) Prior Publication Data

US 2020/0070391 A1    Mar. 5, 2020

Related U.S. Application Data

(62) Division of application No. 15/899,085, filed on Feb. 19, 2018, now Pat. No. 10,479,007.

(60) Provisional application No. 62/472,816, filed on Mar. 17, 2017.

(51) Int. Cl.
| | |
|---|---|
| *A47B 13/00* | (2006.01) |
| *B29C 45/14* | (2006.01) |
| *B29C 45/00* | (2006.01) |
| *B29C 45/73* | (2006.01) |
| *B65D 19/00* | (2006.01) |
| *B29L 31/00* | (2006.01) |

(52) U.S. Cl.
CPC .... *B29C 45/14065* (2013.01); *B29C 45/0046* (2013.01); *B29C 45/73* (2013.01); *B65D 19/0016* (2013.01); *B29C 45/14311* (2013.01); *B29C 45/14778* (2013.01); *B29C 2045/14114* (2013.01); *B29C 2045/14155* (2013.01); *B29L 2031/7178* (2013.01); *B65D 2203/10* (2013.01); *B65D 2519/00034* (2013.01); *B65D 2519/00069* (2013.01); *B65D 2519/00273* (2013.01); *B65D 2519/00288* (2013.01); *B65D 2519/00318* (2013.01); *B65D 2519/00333* (2013.01)

(58) Field of Classification Search
CPC .............. H01L 21/565; B65D 19/0016; B65D 2519/00034; B65D 2519/0069; B65D 2519/00273; B65D 2519/00288; B65D 2519/00318; B65D 2519/00333; B65D 2203/10
USPC ................................ 340/572.18; 264/272.15
See application file for complete search history.

(56) References Cited

U.S. PATENT DOCUMENTS

| | | | |
|---|---|---|---|
| 5,586,657 | A | 12/1996 | Ward et al. |
| 5,811,163 | A | 9/1998 | Ohno et al. |
| 5,868,986 | A | 2/1999 | Foulkes |
| 5,871,100 | A | 2/1999 | Ward |

(Continued)

FOREIGN PATENT DOCUMENTS

| | | |
|---|---|---|
| CA | 2272017 | 11/1999 |
| DE | 19739438 | 3/1999 |

(Continued)

*Primary Examiner* — Matthew W Ing
(74) *Attorney, Agent, or Firm* — Carlson, Gaskey & Olds, P.C.

(57) ABSTRACT

An injection molded component includes a wall that has an inner wall surface and an outer wall surface. A sensor is molded into one of the inner wall surface and the outer wall surface. A channel is at least partially surrounding the sensor.

21 Claims, 11 Drawing Sheets

(56) References Cited

U.S. PATENT DOCUMENTS

| | | |
|---|---|---|
| 6,011,472 A | 1/2000 | Pemdergrah et al. |
| 6,031,459 A * | 2/2000 | Lake ................ G06K 19/07728 340/5.61 |
| 6,152,299 A | 11/2000 | O'Malley et al. |
| 6,206,282 B1 | 3/2001 | Hayes, Sr. et al. |
| 6,302,461 B1 | 10/2001 | Compagnie |
| 6,441,741 B1 | 8/2002 | Yoakum |
| 6,483,434 B1 | 11/2002 | Umiker |
| 6,484,875 B1 | 11/2002 | Brainerd et al. |
| 6,574,166 B2 | 6/2003 | Niemiec |
| 6,943,678 B2 | 9/2005 | Muirhead |
| 7,080,787 B2 | 7/2006 | Wulff et al. |
| 7,113,101 B2 | 9/2006 | Petersen et al. |
| 7,135,979 B2 | 11/2006 | Brady |
| 7,226,220 B2 | 6/2007 | Choy et al. |
| 7,261,539 B2 | 8/2007 | Pitscheneder et al. |
| 7,299,981 B2 | 11/2007 | Hickle et al. |
| 7,323,990 B2 | 1/2008 | Urban |
| 7,354,001 B2 | 4/2008 | Wulff et al. |
| 7,528,727 B2 | 5/2009 | Morrow |
| 7,804,400 B2 | 9/2010 | Muirhead |
| 7,948,384 B1 | 5/2011 | Kennedy |
| 9,108,338 B2 | 8/2015 | Sirovskiy et al. |
| 9,203,191 B2 | 12/2015 | Bogart |
| 9,362,688 B2 | 6/2016 | Bogart |
| 9,697,451 B2 | 7/2017 | Bogart |
| 9,818,008 B2 | 11/2017 | Bogart |
| 10,074,952 B2 | 9/2018 | Bogart |
| 2004/0094949 A1 | 5/2004 | Savagian et al. |
| 2004/0238623 A1 | 12/2004 | Asp |
| 2005/0068182 A1 | 3/2005 | Dunlap et al. |
| 2005/0280542 A1 | 12/2005 | Shieh |
| 2006/0113716 A1 | 6/2006 | Binda et al. |
| 2006/0163269 A1 | 7/2006 | Anderson et al. |
| 2006/0243174 A1 | 11/2006 | Muirhead |
| 2006/0273180 A1 | 12/2006 | Ammond et al. |
| 2007/0030151 A1 | 2/2007 | Morrow |
| 2007/0138304 A1 | 6/2007 | Dorfner et al. |
| 2007/0182562 A1 | 8/2007 | Abbott et al. |
| 2007/0218227 A1 | 9/2007 | Nishizawa et al. |
| 2007/0256136 A1 | 11/2007 | Simske et al. |
| 2007/0256358 A1 | 11/2007 | Schromm |
| 2008/0088459 A1 | 4/2008 | Martin et al. |
| 2012/0248199 A1 | 10/2012 | Schimmel |
| 2012/0318877 A1 | 12/2012 | Marur et al. |
| 2014/0007799 A1 * | 1/2014 | Nasseri ................ A47B 13/10 108/156 |
| 2015/0154433 A1 | 6/2015 | Stewart |
| 2015/0174803 A1 | 6/2015 | Newman et al. |
| 2015/0217059 A1 | 8/2015 | Ashby et al. |
| 2016/0079723 A1 | 3/2016 | Bogart |

FOREIGN PATENT DOCUMENTS

| | | |
|---|---|---|
| DE | 102004045459 | 3/2006 |
| DE | 102004059962 | 6/2006 |
| JP | H02084319 | 3/1990 |
| JP | H08056799 | 3/1996 |
| JP | 2003081344 | 3/2003 |
| JP | 2005263288 | 9/2005 |
| WO | 0007904 | 2/2000 |
| WO | 2001072260 | 10/2001 |
| WO | 03060818 | 7/2003 |
| WO | 2015073964 | 5/2015 |

* cited by examiner

INJECTION MOLDED COMPONENT AND METHOD OF INJECTION MOLDING

The application is a divisional of U.S. application Ser. No. 15/899,085 filed Feb. 19, 2018, which claims priority to U.S. Provisional Application No. 62/472,816, which was filed on Mar. 17, 2017.

BACKGROUND

The disclosure relates to injection molded components. More particularly, the disclosure relates to injection molded components, such as pallets or receptacles, having at least one sensor associated with the injection molded component.

When packing or transporting goods on pallets or in receptacles, it is beneficial to the user to quickly and easily identify the goods stored on the pallet or in the receptacle, where the goods are being shipped, and/or the origin of the goods in addition to other information of the injection molded component. A number of approaches have been used to provide information to the user through the use of an indicator associated with the injection molded component. However, there is a need to improve the manufacturability of the injection molded components and the operability of indicators associated with the injection molded components.

SUMMARY

In one exemplary embodiment, an injection molded component includes a wall that has an inner wall surface and an outer wall surface. A sensor is molded into one of the inner wall surface and the outer wall surface. A channel is at least partially surrounding the sensor.

In another exemplary embodiment, a mold assembly includes a first mold wall that includes an inner surface. A wall extends from the inner surface to define a suction surface. At least one vacuum line is in fluid communication with the suction surface. A second mold wall opposes the first mold wall and includes at least one extendable pin.

In another exemplary embodiment, a mold assembly includes a first mold wall that includes an inner surface. A portion of the inner surface defines a recessed surface. A first plurality of ribs extends across the recessed surface and includes a sensor contact surface that extends in a plane parallel to the recessed surface.

In another exemplary embodiment, a method of forming an injection molded component comprising the step of locating a sensor against a first surface of a mold. An edge of the sensor is surrounded by a wall that extends from the first surface of the mold. An injectable material is injected into the mold such that the injectable material travels over an inner surface of the sensor.

These and other features of the disclosed examples can be understood from the following description and the accompanying drawings, which can be briefly described as follows.

DETAILED DESCRIPTION

Figure 1:
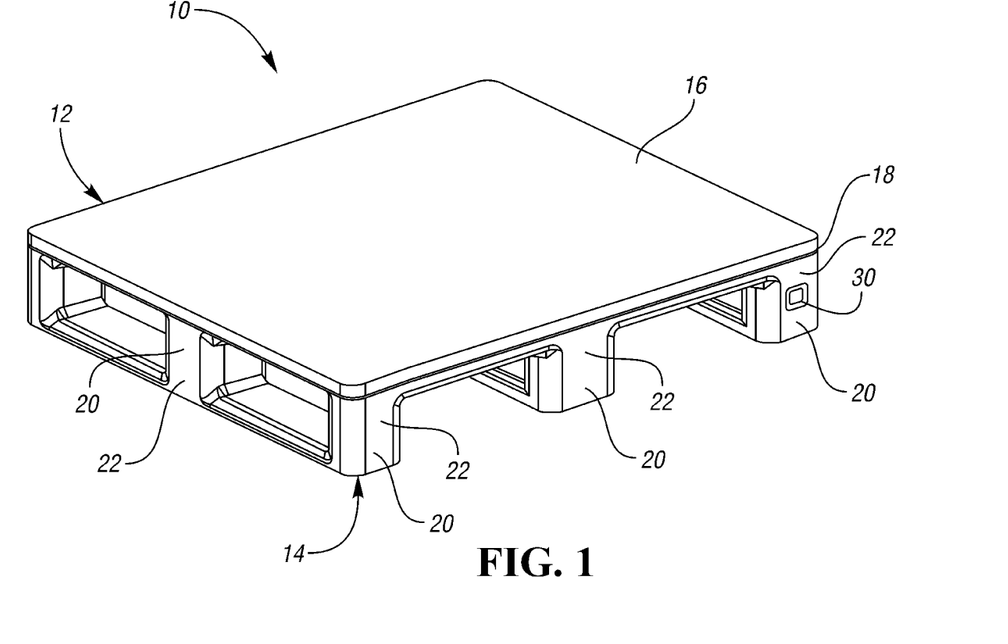
FIG. 1 illustrates an example injection molded component, such as a pallet, according to a non-limiting example of this disclosure.

FIG. 1 illustrates a pallet 10 according to one non-limiting example of this disclosure. The pallet 10 includes a top deck 12 and a bottom deck 14. The top deck 12 and the bottom deck 14 are molded from a plastic material such as polypropylene via an injection molding process, but of course may be formed of various polymeric materials and processes to achieve the desired characteristics.

The top deck 12 includes an upper surface 16 for supporting goods thereon. The top deck 12 mates with the bottom deck 14 at a mating line 18. The bottom deck 14 includes multiple columns 20 that extend downward. The columns 20 located along a perimeter of the pallet 10 include a wall having an outer surface 22 that is generally flat. One or more of the outer surfaces 22 include a RFID tag 30 molded into the column 20. Although the RFID tag 30 is shown in one of the columns 20, the RFID tag 30 could also be located in the upper surface 16 or another suitable location on the pallet 10. Moreover, multiple RFID tags 30 could be incorporated into the pallet 10. Additionally, the RFID tag 30 could be used in another injection molded product, such as a crate or another type of receptacle. Moreover, other sensors, such as UHF, NFC, GPS, Bluetooth, and temperature sensors, could be used in place of or in addition to the RFID components in the RFID tag 30.

Figure 2:
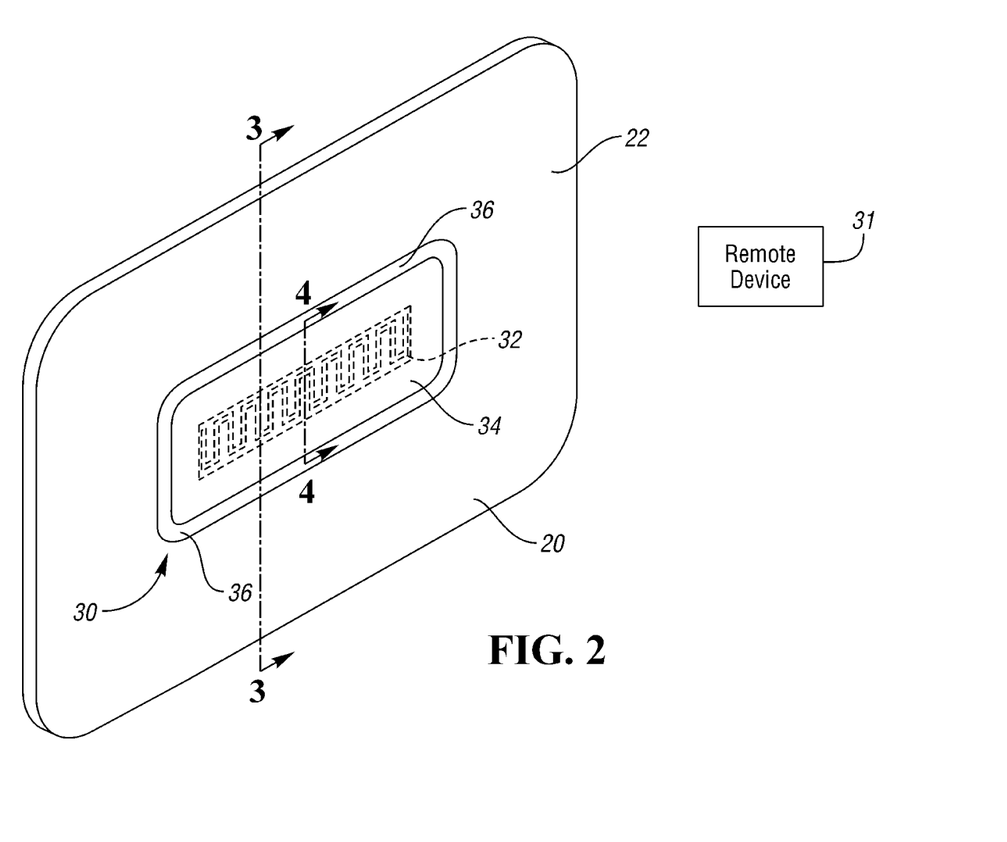
FIG. 2 illustrates an enlarged view of a portion of the pallet of FIG. 1 including an example tag.

FIG. 2 illustrates an enlarged view of the RFID tag 30 in the outer surface 22 of the column 20. The column The RFID tag 30 includes an antenna 32 capable of communicating with a remote device 31, such as a RFID tag reader, through radio wave communication. The RFID tag 30 transmits information about the pallet 10, the goods stored on the pallet 10, or the origin/destination of the goods stored on the pallet 10 to the remote device 31. In the illustrated non-limiting example, the antenna 32 follows an elongated serpentine pattern such that the RFID tag 30 has an elongated rectangular shape in the outer surface 22 of the column 20.

Figure 3:
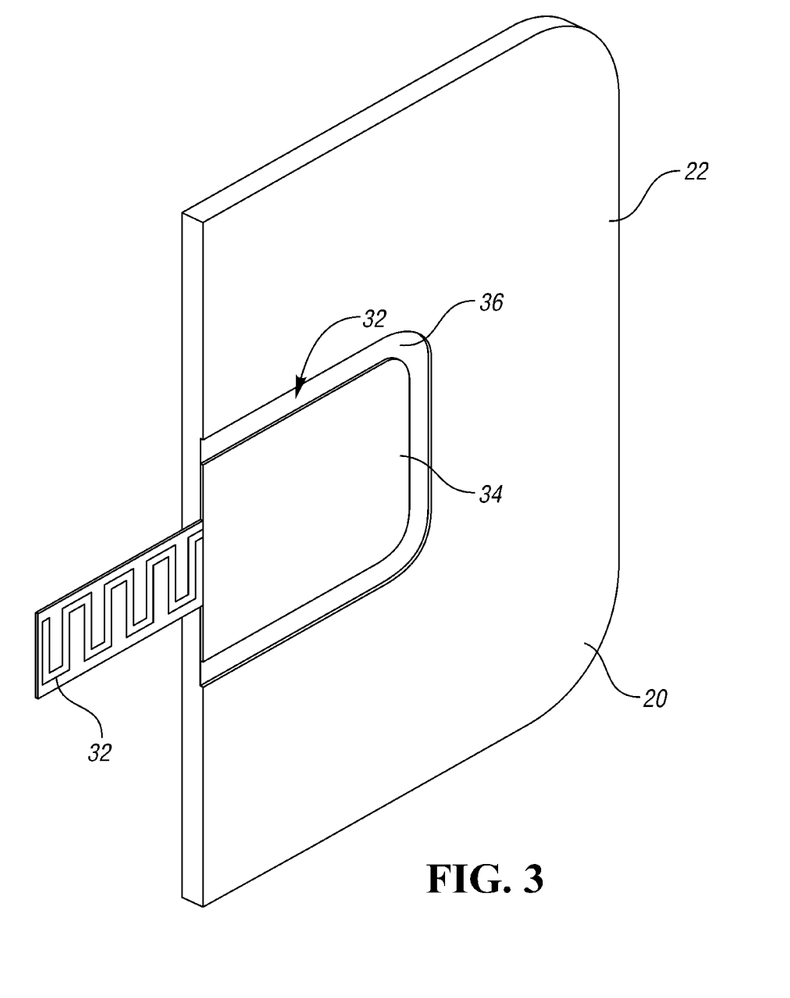
FIG. 3 is an enlarged cross-sectional view taken along line 3-3 of FIG. 2.

The RFID tag 30 includes an outer construction 34 that is flush or recessed with respect to the outer surface 22 of the column 20. The outer construction 34 provides protection for the antenna 32. FIG. 3 is a cross-sectional view through the outer surface 22 and the outer construction 34 but not the antenna 32 along line 3-3 of FIG. 2. The antenna 32 is located between the outer construction 34 and the column 20. The outer construction 34 can be the same material as the injection molded portion of the pallet 10 or a dissimilar material. The outer construction 34 can also match the color of the column 20 or be of a contrasting color to the column 20. The outer construction 34 is also surrounded by a channel 36 that separates the outer construction 34 from the outer surface 22 of the column 20.

Figure 4:
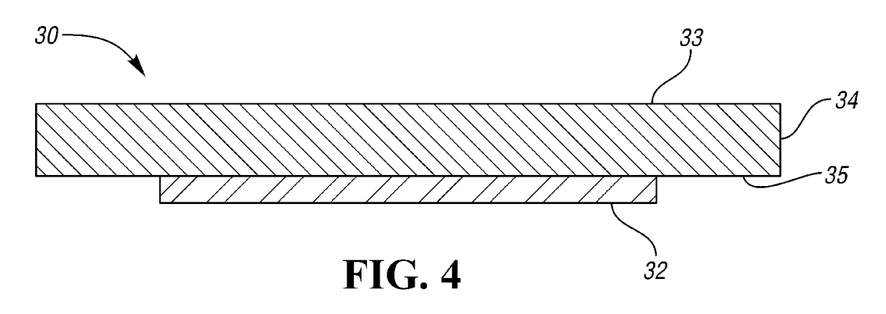
FIG. 4 is an enlarged cross-sectional view of the example tag taken along line 4-4 of FIG. 2.

FIG. 4 illustrates a cross-sectional view of the RFID tag 30 along line 4-4 of FIG. 2. In the illustrated non-limiting example, the RFID tag 30 includes the outer construction 34 having a first construction surface 33 and a second construction surface 35 on an opposite side of the outer construction 34 from the first construction surface 33. The first construction surface 33 of the outer construction 34 faces the same direction as the outer surface 22 of the column 20.

The antenna 32 is printed directly onto the second construction surface 35 of the outer construction 34 such that the antenna 32 is spaced from the outer surface 22 of the column 20 by the thickness of the outer construction 34. The antenna 32 and a portion of the second construction surface 35 not covered by the antenna 32 would face into the column 20 of the pallet 10 and be located adjacent and bond to the injection molded material of the pallet 10. In the illustrated non-limiting example, a thickness dimension of the outer construction 34 is greater than a thickness dimension of the antenna 32 and the antenna 32 only covers a portion of the second construction surface 35.

Figure 5:
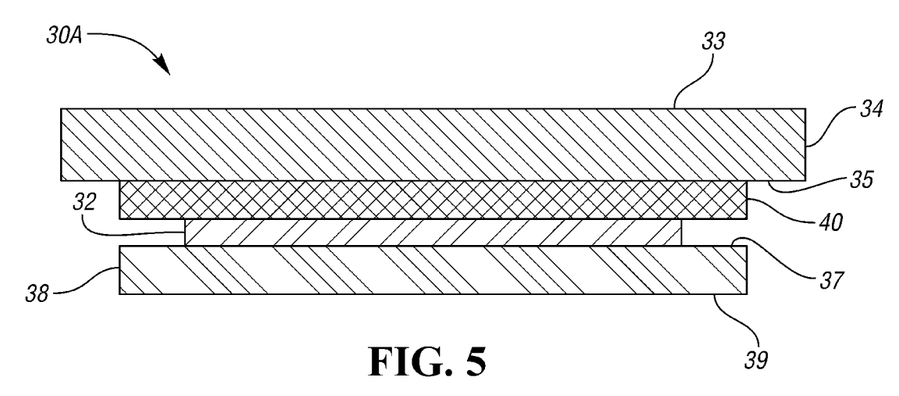
FIG. 5 is an enlarged cross-sectional view of another example tag.

FIG. 5 illustrates a cross-sectional view of another example RFID tag 30A. The RFID tag 30A is similar to the RFID tag 30 except where noted below or shown in the Figures. The RFID tag 30A includes the outer construction 34, a first layer of adhesive 40, the antenna 32, and an inlay 38.

Instead of the antenna 32 being printed directed onto the outer construction 34 as with the RFID tag 30 shown in FIG. 4, the antenna 32 in the RFID tag 30A is attached to the second construction surface 35 of the outer construction 34 with the first layer of adhesive 40 located between the antenna 32 and the outer construction 34.

Because the antenna 32 is not printed directly onto the outer construction 34 in the RFID tag 30A, the inlay 38 is used to provide support for the antenna 32. The antenna 32 is attached to a first inlay surface 37 on the inlay 38. The inlay 38 also includes a second inlay surface 39 located on an opposite side of the inlay 38 from the first inlay surface 37 and the antenna 32. The second inlay surface 39 faces into the column 20 of the pallet 10 and would be located adjacent and bond to the injection molded material of the pallet 10 along with a portion of the second construction surface 35 of the outer construction 34.

In the illustrated non-limiting example, a thickness dimension of the outer construction 34 is greater than a thickness dimension of the antenna 32 and a thickness dimension of the inlay 38. The thickness dimension of the inlay 38 is less than a thickness dimension of the outer construction 34 and greater than a thickness dimension of the antenna 32.

The inlay 38 can be made of the same material as the outer construction 34 or of a dissimilar material from the outer construction 34. When the inlay 38 is made of a similar material as the outer construction 34, the inlay 38 will act as a heat shield during molding of the pallet 10 and reduce the amount of blistering that appears on the first construction surface 33 that can result from molding.

Figure 6:
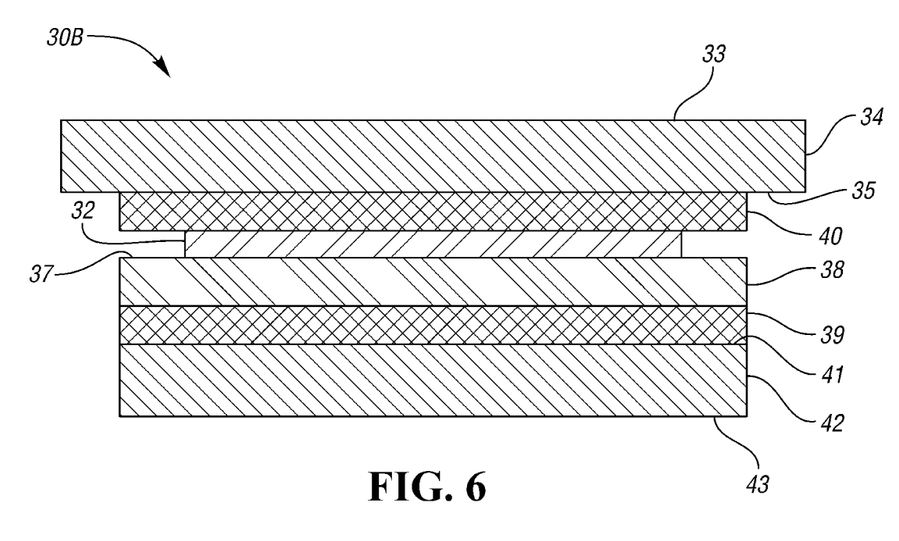
FIG. 6 is an enlarged cross-sectional view of yet another example tag.

FIG. 6 illustrates a cross-sectional view of yet another non-limiting example RFID tag 30B. The RFID tag 30B is similar to the RFID tags 30, 30A except where noted below or shown in the Figures. The RFID tag 30B includes the outer construction 34, the first layer of adhesive 40, the antenna 32, the inlay 38, a second layer of adhesive 44, and an inner construction 42.

Instead of the inner most layer of the RFID tag 30B being the inlay 38 as shown with the RFID tag 30A in FIG. 5, the RFID tag 30B includes the second layer of adhesive 44 and the inner construction 42 located inward from the second inlay surface 39. The inner construction 42 includes a first inner construction surface 41 and a second inner construction surface 43 located on an opposite side of the inner construction 42 from the first inner construction surface 41. The second layer of adhesive 44 contacts the second inlay surface 39 and the first inner construction surface 41 to fix the inlay 38 relative to the inner construction 42.

In the non-limiting illustrated example, dimensions of the first and second inner construction surfaces 41, 43 are equal to or greater than dimensions of the first and second inlay surfaces 37, 39. Additionally, the dimensions of the first and second inner construction surfaces 41, 43 are less than dimensions of the first and second construction surfaces 33, 35. As described above in relation to the inlay 38 in the RFID tag 30A, the inner construction 42 will also further act as a heat shield during molding of the pallet 10 and reduce the amount of blistering that appears on the first construction surface 33 that can result from molding.

In the illustrated non-limiting example, a thickness dimension of the outer construction 34 is greater than a thickness dimension of the antenna 32 and a thickness dimension of the inlay 38. The thickness dimension of the inlay 38 is less than a thickness dimension of the outer construction 34 and greater than a thickness dimension of the antenna 32. A thickness dimension of the inner construction 42 is greater than the thickness dimension of the inlay 38 and less than or equal to the thickness dimension of the outer construction 34.

Figure 7:
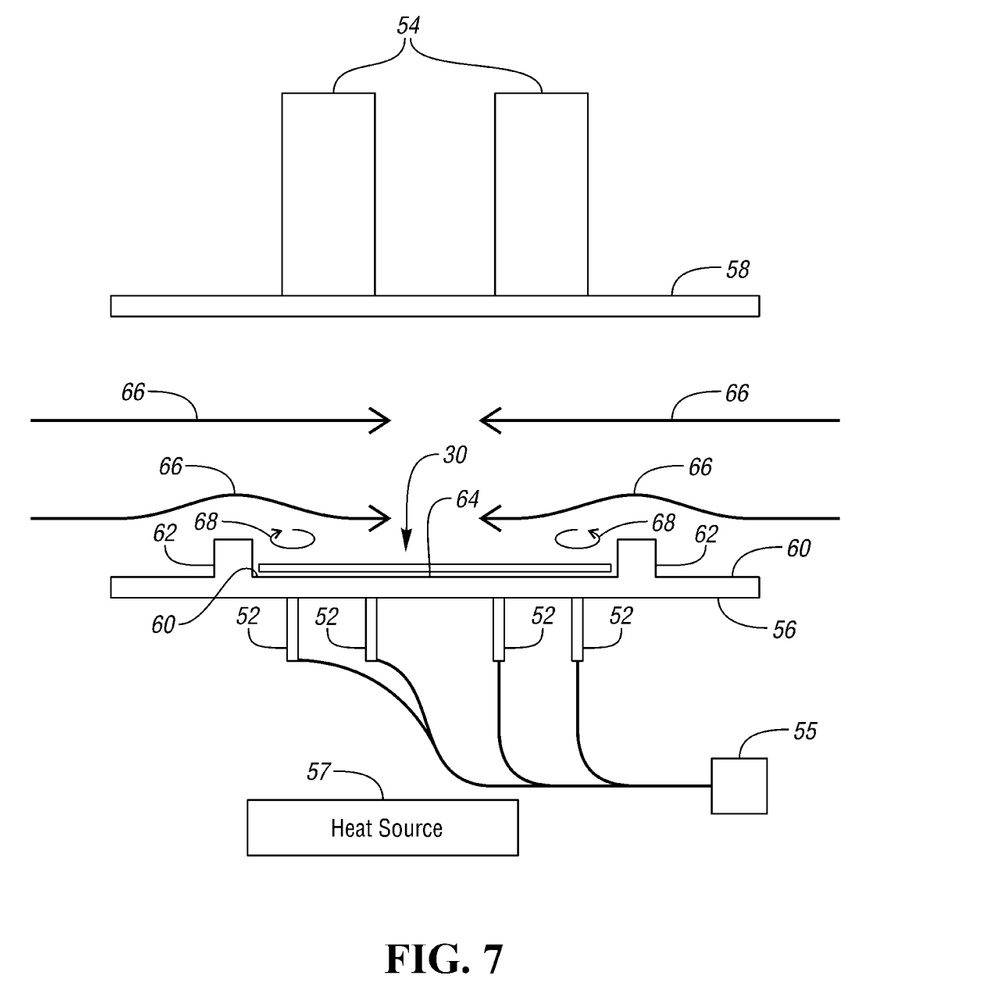
FIG. 7 is a cross-sectional view of a mold illustrating flow patterns.
Figure 8:
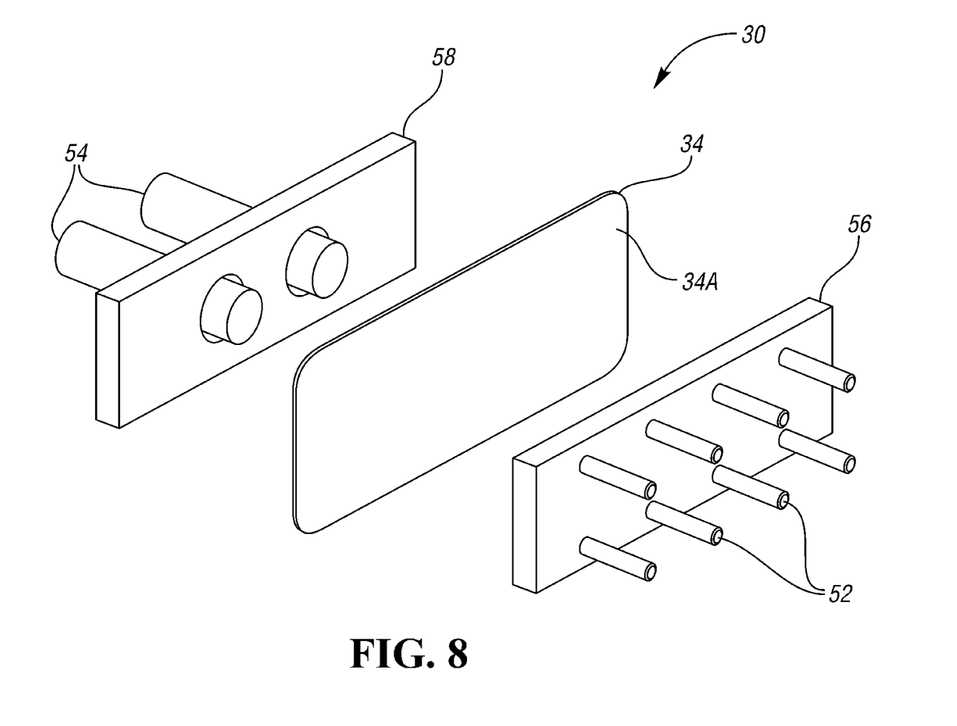
FIG. 8 is a perspective view of a portion of the mold shown in FIG. 7.
Figure 9:
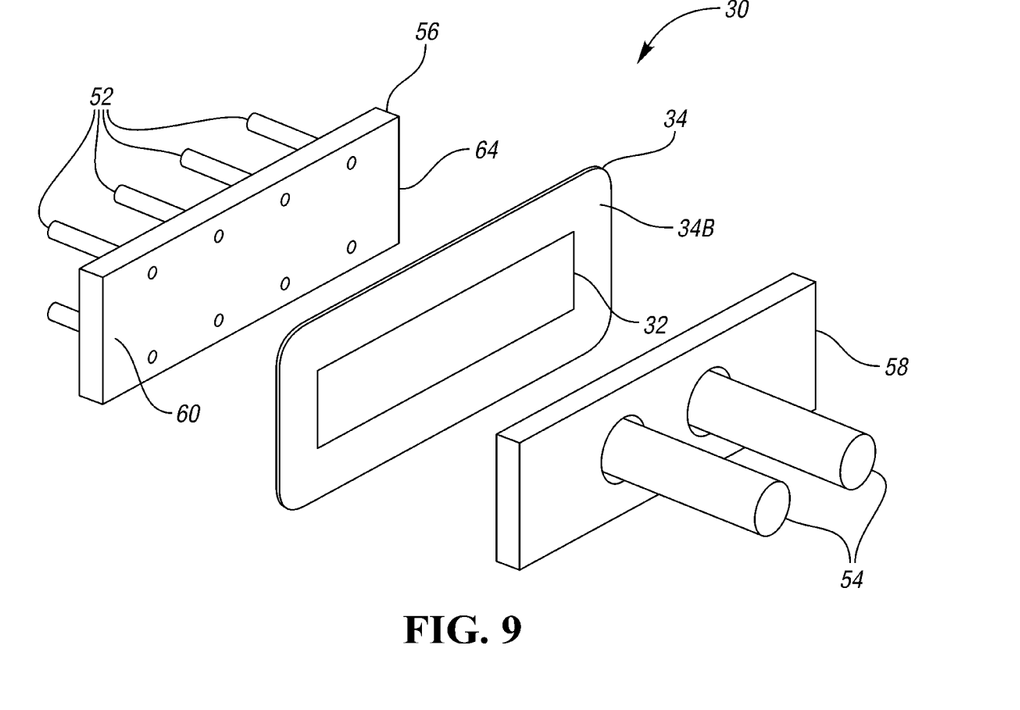
FIG. 9 is a perspective view of an example suction surface of the mold shown in FIG. 7.

In order to ensure that the RFID tag 30 remains in a desired orientation while material is injected into the mold to form the pallet 10 or any other injection molded product, a unique mold confirmation is utilized. FIG. 7 illustrates a cross-sectional view of the mold and RFID tag 30. The unique molding configuration incorporates a combination of a wall or dam 62 in a mold surface and vacuum lines 52 and/or pins 54 as shown in FIGS. 7-9. A heat source 57 can also be used to warm the RFID tag 30 to encourage bonding with the injected material.

FIG. 7 illustrates a cross-sectional view of a pallet mold through the RFID tag 30. The mold includes an outer portion 56 and an inner portion 58. The outer portion 56 includes an inner surface 60 that forms the outer surface 22 of the column 20. The RFID tag 30 is also located adjacent the inner surface 60 of the outer portion 56 of the mold.

The inner surface 60 of the mold also includes the wall 62 that surrounds the RFID tag 30. The height of the wall 62 is greater than a thickness of the entire RFID tag 30. In the illustrated embodiment, the wall 62 surrounds a portion of the inner surface 60 to define a suction surface 64 dimensioned to be larger than the first construction surface 33 of the outer construction 34, which is the portion of the RFID tag 30 that is in contact with the inner surface 60.

The vacuum lines 52 are in fluid communication with the suction surface 64 to generate a suction force to hold the RFID tag 30 to the inner surface 60. The pins 54 are extendable across the mold to engage an inner surface of the RFID tag 30 to further maintain the RFID tag 30 in place during the initial stages of the molding process. Although multiple suction lines 52 are shown in the illustrated non-limiting embodiment, only a single suction line could be used. The pins 54 are removed during the injection molding process to prevent the formation of passageways extending through the wall of the column 20 an inner side of the RFID tag 30.

In one example, the suction surface 64 is larger than the outer construction 34 on RFID tag 30 to allow material injected into the mold to fill a space between a perimeter of the RFID tag 30 and the wall 62. In another example, a perimeter of the outer construction 34 fits tightly against the wall 62 such that injected material will not reach the suction surface 64.

The wall 62 protects to the RFID tag 30 during the injection molding process to prevent the RFID tag 30 from moving or shifting during the injection molding process. Arrows 66 indicate possible flow directions for the injected material entering the mold and passing over the RFID tag 30. When the injected material travels over the wall 62, the wall 62 prevents the injected material from moving the RFID tag 30 by disrupting the generally linear flow of the injected material and creating turbulent flow fields as indicated by arrows 68 adjacent the wall 62 and the RFID tag 30.

FIGS. 8 and 9 illustrate a portion of the outer portion 56 and the inner portion 58 of the mold on opposite sides the RFID tag 30 that engage the RFID tag 30 with only the suction surface 64 shown on the inner surface 60. The vacuum lines 52 are in fluid communication with the suction surface 64 to provide a negative pressure through a suction force from the external source 55 (FIG. 5) to secure the first construction surface 33 of the outer construction 34 of the RFID tag 30 against the suction surface 64.

The pins 54 retractably extend through the inner portion 58 of the mold to engage the inner surface of the RFID tag 30 to further secure the RFID tag 30 against the suction surface 64. The pins 54 retract once a predetermined amount of material has been injected into the mold to prevent the formation of passageways through the columns 20 to the RFID tag 30. Alternatively, the pins 54 are extended during the high speed injection phase and retract during the slow speed injection phase.

Figure 10:
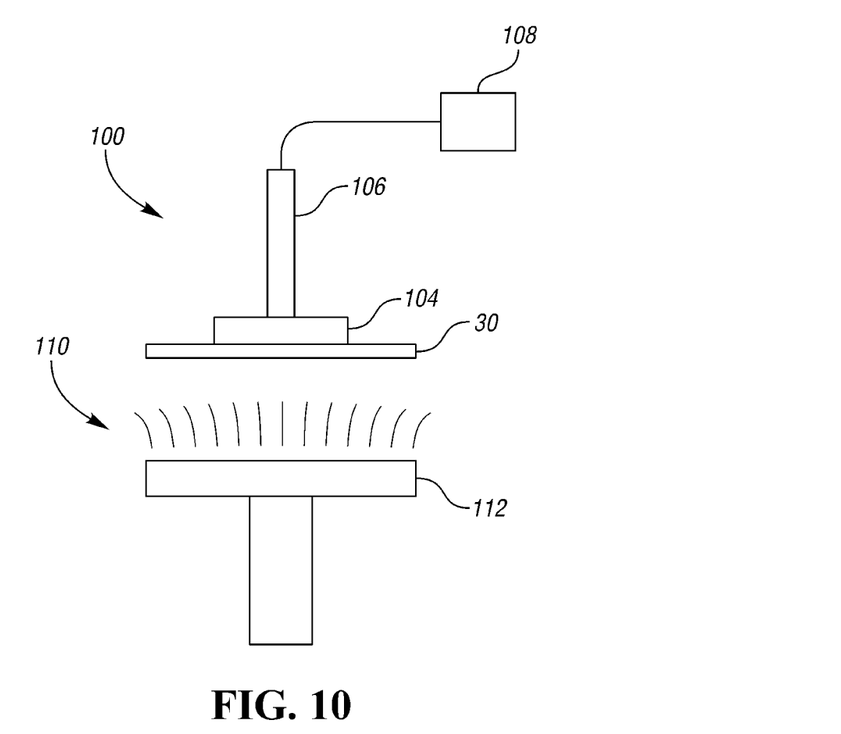
FIG. 10 illustrates a portion of an automation system for manipulating the example tag of FIG. 2.

FIG. 10 illustrates a portion of an automation system 100 used for placing the RFID tag 30 against the suction surface 64 within the mold. The automation system 100 engages the RFID tag 30 with a suction device 102. The suction device 102 includes a suction head 104 for directly contacting and manipulating the RFID tag 30 and a suction line 106 in fluid communication with a suction source 108. The suction device 102 transports the RFID tag 30 past a static charger 110 having a static charging head 112, which applies a static charge to the RFID tag 30 to assist in securing the RFID tag 30 against the suction surface 64 as discussed below.

Figure 11:
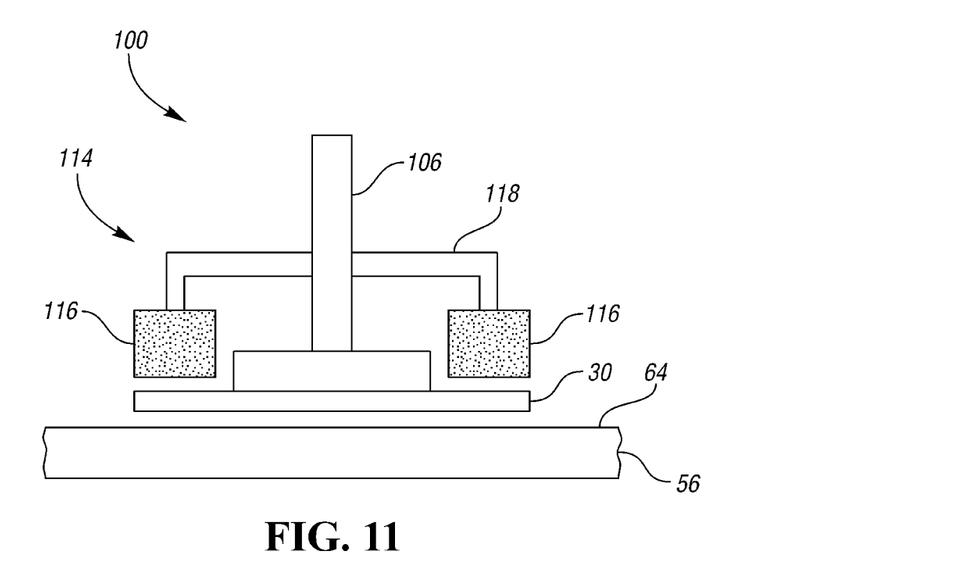
FIG. 11 illustrates another portion of the automation system of FIG. 10.

The suction device 102 then places the RFID tag 30 against the suction surface 64 of the outer portion 56 of the mold. A leveling member 114 of the automation system 100 includes soft contacts 116 connected to an extendable arm 118. The extendable arm 118 of the leveling member 114 extends past the suction device 102 to engage an inner surface of the RFID tag 30 that extends outward past the suction head 104. Because a portion of the RFID tag 30 extends past the suction head 104 in the illustrated example, the RFID tag 30 could curl away from the suction surface 64 and extend into the injection flow. To prevent this from happening, the leveling member 114 engages the inner surface of the RFID tag 30 and presses the RFID tag 30 against the suction surface 64. The static charge on the RFID tag 30 from the static charger 110 also prevents the RFID tag 30 from curling when placed against the suction surface 64.

Figure 12:
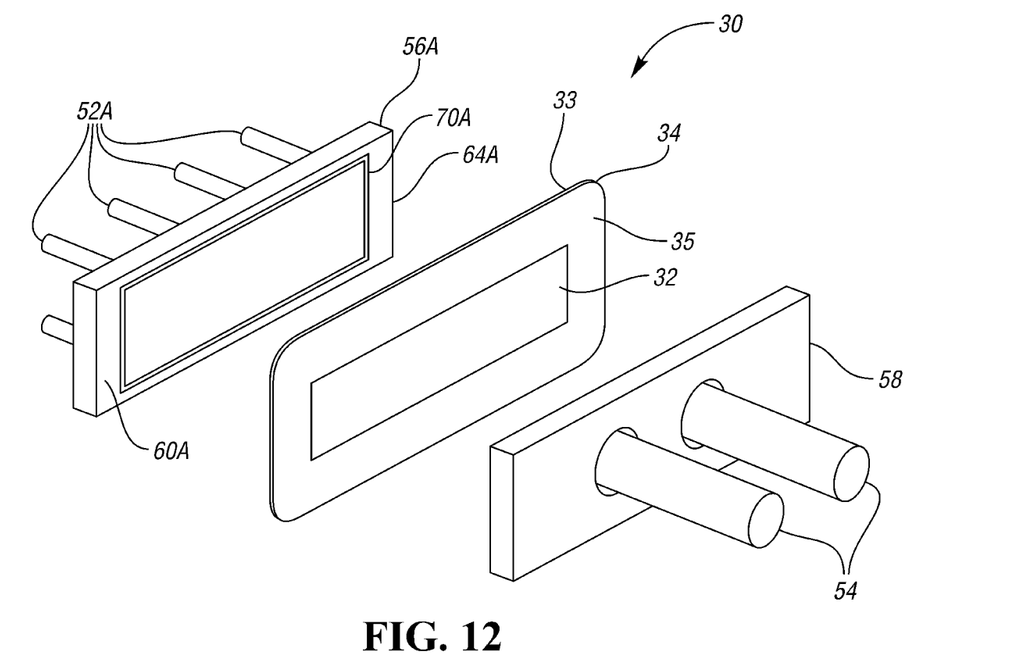
FIG. 12 is a perspective view of another example suction surface of the mold.

FIG. 12 illustrates the inner portion 58 and RFID tag 30 with another example outer portion 56A. The outer portion 56A is similar to the outer portion 56 except were described below or shown in the Figures.

Vacuum lines 52A are in fluid communication with a vacuum channel 70A in a suction surface 64A to provide a negative pressure through a suction force from the external source 55 (FIG. 7) to secure the first construction surface 33 of the outer construction 34 of the RFID tag 30 against the suction surface 64A. In the illustrated non-limiting example, the vacuum channel 70A is recessed into the suction surface 64A and includes a rectangular shape corresponding to the shape of the RFID tag 30.

Figure 13:
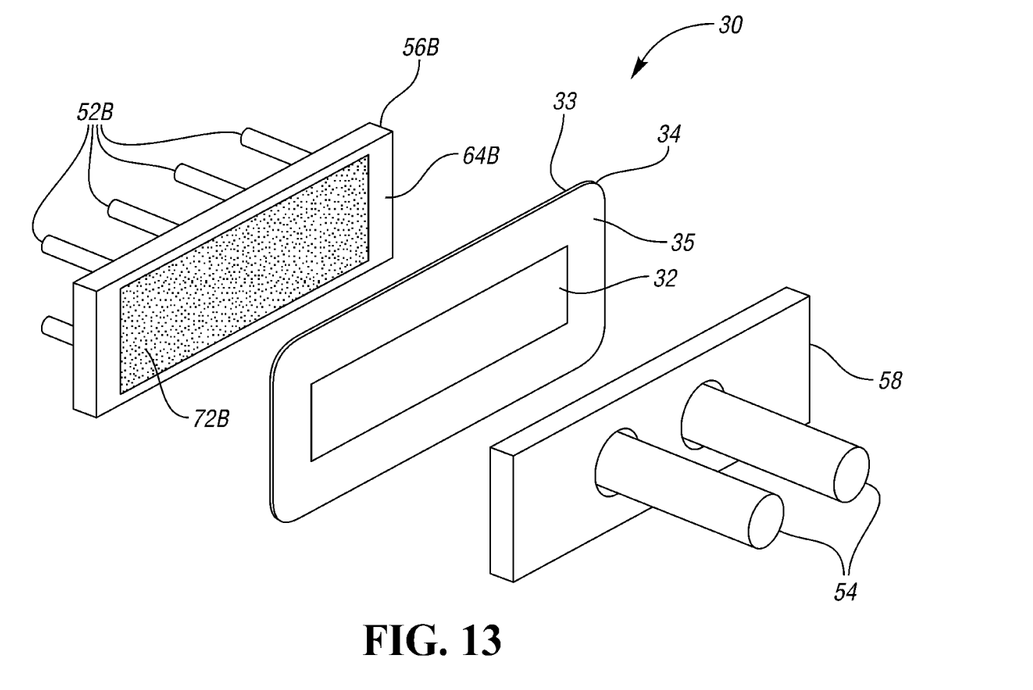
FIG. 13 is a perspective view of yet another example suction surface of the mold.

FIG. 13 illustrates the inner portion 58 and RFID tag 30 with yet another example outer portion 56B. The outer portion 56B of the mold is similar to the outer portion 56 except were described below or shown in the Figures.

Vacuum lines 52B are in fluid communication with a porous material 72B in a suction surface 64B to provide a negative pressure through a suction force from the external source 55 (FIG. 7) to secure the first construction surface 33 of the outer construction 34 of the RFID tag 30 against the suction surface 64A. Because the porous material 72B covers a larger area of the suction surface 64B, the RFID tag 30 can be secured with greater force. Additionally, the large surface area of the porous material 72B allows the RFID tag 30 to be placed against the suction surface 64B with less accuracy because the RFID tag 30 can establish a sufficient seal by overlapping with a smaller portion of the porous material 72B.

Figure 14:
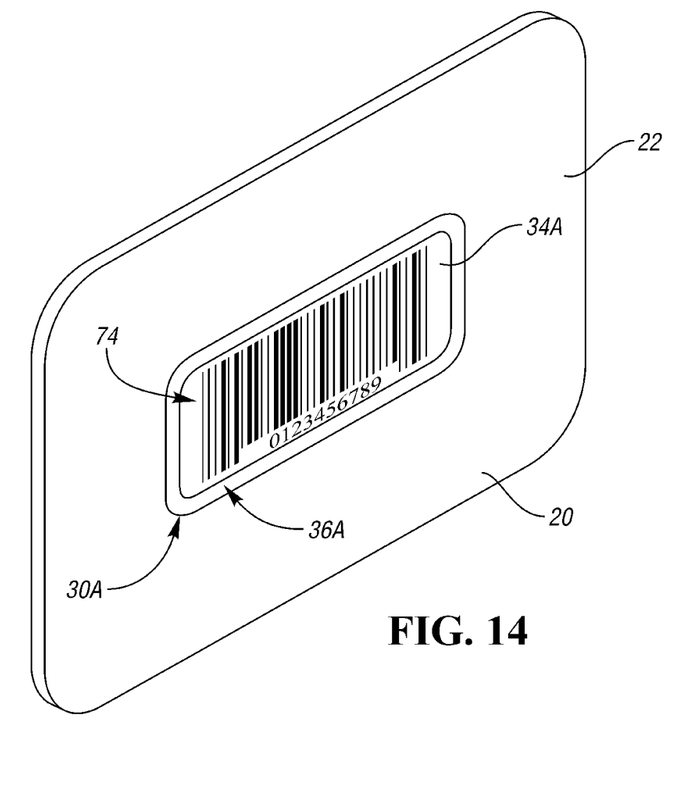
FIG. 14 is a perspective view of a portion of the pallet of FIG. 1 including the example tag of FIG. 2 having a visual indicator.

FIG. 14 illustrates another example RFID tag 30A similar to the RFID tag 30 except where described below or shown in the Figures. The outer construction 34A includes an identifier 74, such as a bar code and/or alpha numeric characters, to provide a visual indication regarding origin, destination, and/or contents stored on the pallet 10. The identifier 74 can be formed into a surface of the outer construction 34A or attached with a sticker.

Figure 15:
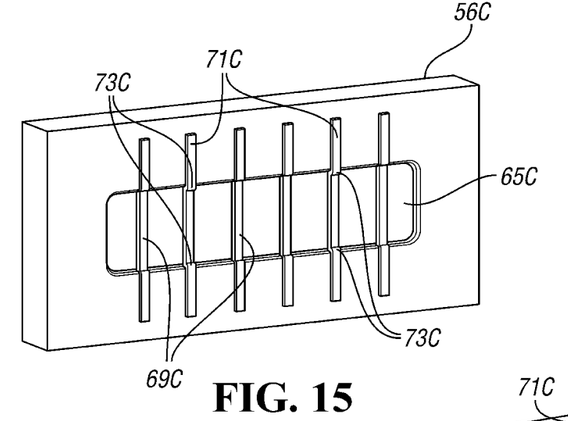
FIG. 15 is a perspective view of a portion of another example mold.
Figure 16:
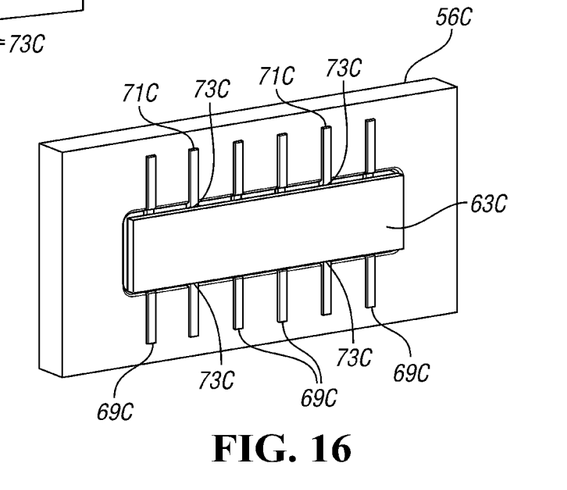
FIG. 16 is a perspective view of the portion of the mold of FIG. 15 with a sensor.

FIG. 15 illustrates a further example outer portion 56C that engages a sensor 63C (FIG. 16), such as RFID, UHF, NFC, GPS, Bluetooth, or temperature sensor. The sensor 63C is covered in a thin wall of plastic to protect the electronics within. The outer portion 56C does not rely on suction as described with the suction surfaces 64 described above.

The outer portion 56C includes a recessed surface 65C facing into a cavity defined by the mold. The recessed surface 65C corresponds in shape to the sensor 63C. A first plurality of side supporting ribs 69C position the sensor 63C a proper distance from the recessed surface 65C to allow injected material to fill the space defined by the recessed surface 65C and a side surface of the sensor 63C.

A second plurality of ribs 71C include ledges 73C that position the sensor 63C a proper distance from to an upper and lower edge of the recessed surface 65C. Although the horizontal and vertical aligning function are performed separately by the first and second plurality of ribs 69C and 71C, respectively, the horizontal and vertical alignment function of these ribs 69C and 71C could be combined into a single rib. Additionally, the first and second plurality of ribs could be arranged in an alternating configuration or in groups of at least two similar ribs adjacent to each other. Moreover, the recessed surface 65C and the first and second plurality of ribs 69C and 71C could be located in the inner portion 58 of the mold.

Figure 17:
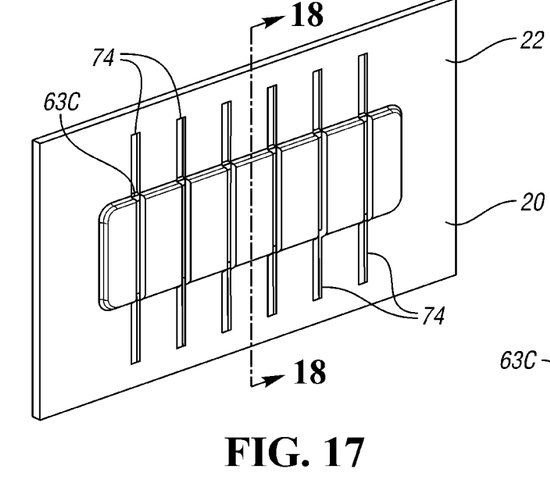
FIG. 17 is a perspective view of the sensor of FIG. 16 molded into a portion of the pallet of FIG. 1.
Figure 18:
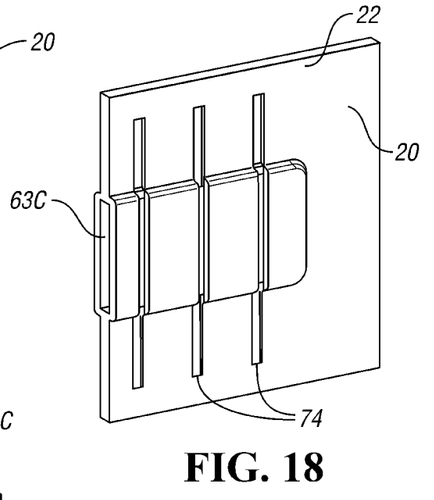
FIG. 18 illustrates a cross-sectional view taken along line 18-18 of FIG. 17.

As shown in FIGS. 17 and 18, the sensor 63C is at least partially suspended in the column 20 of the pallet 10. The outer surface 22 of the pallet 10 also includes a plurality of slots 74 that correspond to the first and second plurality of ribs 69C and 71C. The sensor 63C is visible through the slots 74.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. An injection molded component comprising:
   a wall having an inner wall surface and an outer wall surface;
   a sensor molded into one of the inner wall surface and the outer wall surface, wherein the sensor is attached to an inner surface of a construction and the construction includes an outer surface forming a portion of the outer wall surface; and
   a channel at least partially surrounding the sensor.

2. The injection molded component of claim 1, wherein the construction and the wall are made of the same material.

3. The injection molded component of claim 1, wherein the construction is recessed relative to the outer wall surface.

4. The injection molded component of claim 1, wherein the sensor includes an antenna and at least a portion of the antenna is printed onto an inner surface of the construction.

5. The injection molded component of claim 1, wherein the sensor includes an antenna having an inner surface and an outer surface and the outer surface of the antenna is attached to an inner surface of the construction with an adhesive and an inner surface of the antenna is attached to an inlay.

6. The injection molded component of claim 1, wherein the sensor includes an antenna having an inner surface and an outer surface and the outer surface of the antenna is attached to an inner surface of the construction with an adhesive and an inner surface of the antenna is attached an inlay and the inlay is attached to a second construction with an adhesive.

7. The injection molded component of claim 6, wherein the second construction includes a smaller surface area relative to the construction.

8. The injection molded component of claim 1, wherein the construction is color matched to the wall.

9. The injection molded component of claim 1, wherein the component is one of a pallet, a receptacle, or a crate.

10. The injection molded component of claim 1, wherein the sensor includes at least one of RFID, UHF, NFC, GPS, Bluetooth, or temperature sensor.

11. The injection molded component of claim 1, wherein the component is a crate.

12. The injection molded component of claim 1, wherein the sensor includes an antenna spaced inward from the channel.

13. The injection molded component of claim 1, wherein a depth of the channel is greater than a thickness of the sensor.

14. The injection molded component of claim 1, wherein the component is a pallet.

15. An injection molded component comprising:
    a wall having an inner wall surface and an outer wall surface;
    a sensor molded into one of the inner wall surface and the outer wall surface, wherein the sensor includes an antenna having an inner surface and an outer surface and the outer surface of the antenna is attached to an inner surface of a construction; and
    a channel at least partially surrounding the sensor and the channel is spaced from the antenna.

16. The injection molded component of claim 15, wherein the sensor is attached to an inner surface of a construction.

17. The injection molded component of claim 16, wherein the construction includes an outer surface forming a portion of the outer wall surface.

18. The injection molded component of claim 17, wherein the antenna is attached to an inner surface of the construction with an adhesive and an inner surface of the antenna is attached to an inlay.

19. The injection molded component of claim 17, wherein the antenna is attached to an inner surface of the construction with an adhesive and an inner surface of the antenna is attached an inlay and the inlay is attached to a second construction with an adhesive.

20. The injection molded component of claim 17, wherein the component is a pallet and the sensor includes at least one of RFID, UHF, NFC, GPS, Bluetooth, or temperature sensor.

21. The injection molded component of claim 15, wherein a depth of the channel is greater than a thickness of the sensor.

* * * * *